Dec. 21, 1965 SHINICHI ISEMURA 3,224,782

APPARATUS FOR TRANSDUCING FROM A STATIONARY RECORD

Filed Dec. 19, 1960 4 Sheets-Sheet 1

Inventor
Shinichi Isemura
By Pierce, Scheffler & Parker
Attorneys

Inventor
Shinichi Isemura
By Pierce, Scheffler & Parker
Attorneys

APPARATUS FOR TRANSDUCING FROM A STATIONARY RECORD

Filed Dec. 19, 1960 4 Sheets-Sheet 3

Inventor
Shinichi Isemura
By Pierce, Scheffler & Parker
Attorneys

United States Patent Office 3,224,782 Patented Dec. 21, 1965

3,224,782

APPARATUS FOR TRANSDUCING FROM A STATIONARY RECORD

Shinichi Isemura, Takaoka, Japan, assignor to Daiei Presscorder Company Limited, Tokyo, Japan, a corporation of Japan Filed Dec. 19, 1960, Ser. No. 76,693
Claims priority, application Japan, Jan. 14, 1960, 35/1,120; July 25, 1960, 35/32,374, 35/32,375
7 Claims. (Cl. 274—14)

This invention relates to a novel system for recording and/or reproducing a stationary record which enables simultaneous looking or reading and hearing and this invention can also be applied to an ordinary circular disc record and for magnetic recording and reproducing a record with or without guide grooves or sound grooves.

Heretofore ordinary systems for recording or reproducing sound use a running or rotating body of a special shape as the recording or reproducing element, such as a recording tape or circular disc type record, but there was no system for recording or reproducing a stationary object as a record or a body on which sound is recorded. If such a novel recording and reproducing system is accomplished it will bring remarkable convenience actually in various usages and also will cause various improvements. For instance, if musical sounds and voices can be recorded at a desired place of books such as picture-magazines, text books etc., and such record can be reproduced under the stationary condition by simple operation at any time as desired it will result in large merits by enjoying simultaneous looking or reading and hearing.

The recording and/or reproducing apparatus for attaining the function of the system of this invention comprises a casing, preferably a cylindrical casing having a diameter fitting to the outer border line or guide groove or ridge specially provided on the outer periphery of a record, or other mark or index for identifying the central position of the apparatus with the center of the record or recording surface, a horizontal rotating member such as a disc or an arm provided at the lower part of the cylindrical casing to be rotated on a vertical shaft rotatably mounted at the center of the casing, an electric motor for rotating said disc or arm, a recording arm pivoted to a vertical shaft provided at an outer position of said rotating member to be turned therewith, a sound recording and/or reproducing head provided at the free end of said arm to project downwards and to be shifted radially through a radial slot provided for the rotating disc or along with the rotating arm, means for balancing said arm against the unbalanced centrifugal force, an operating mechanism of said motor, and electrical means for amplifying and transmitting a sound energy generated by said recording or reproducing head, so arranged that the apparatus is put on the surface of a stationary record and said rotating member is turned by a motor to rotate the recording or reproducing arm therewith and to actuate the head at the end of the arm to be shifted on a record, thereby recording or reproducing the sound or voice.

Figure 1:
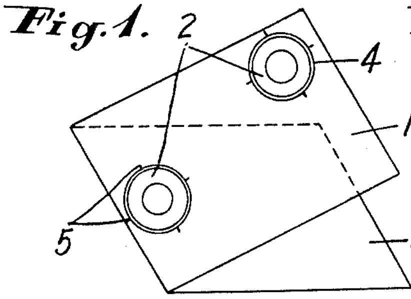
Figure 2:
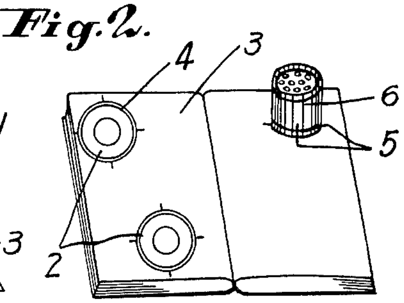
Figure 3:
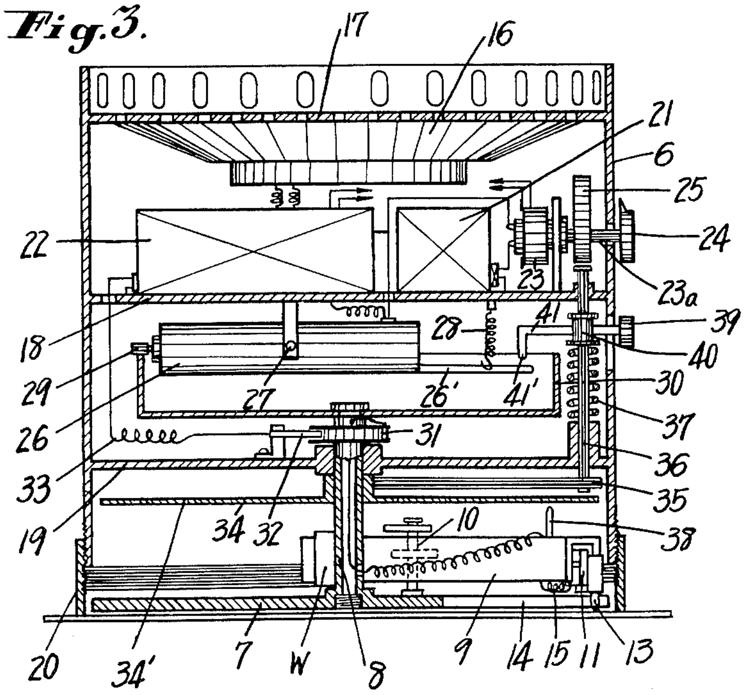
Figure 5:
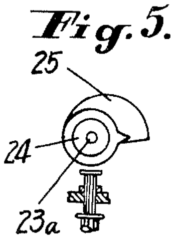
Figure 6:
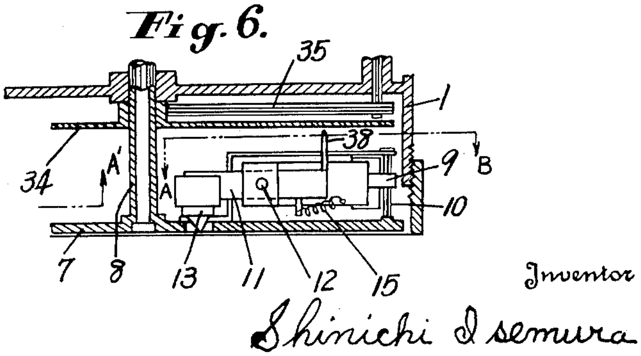
Figures 4, 7:
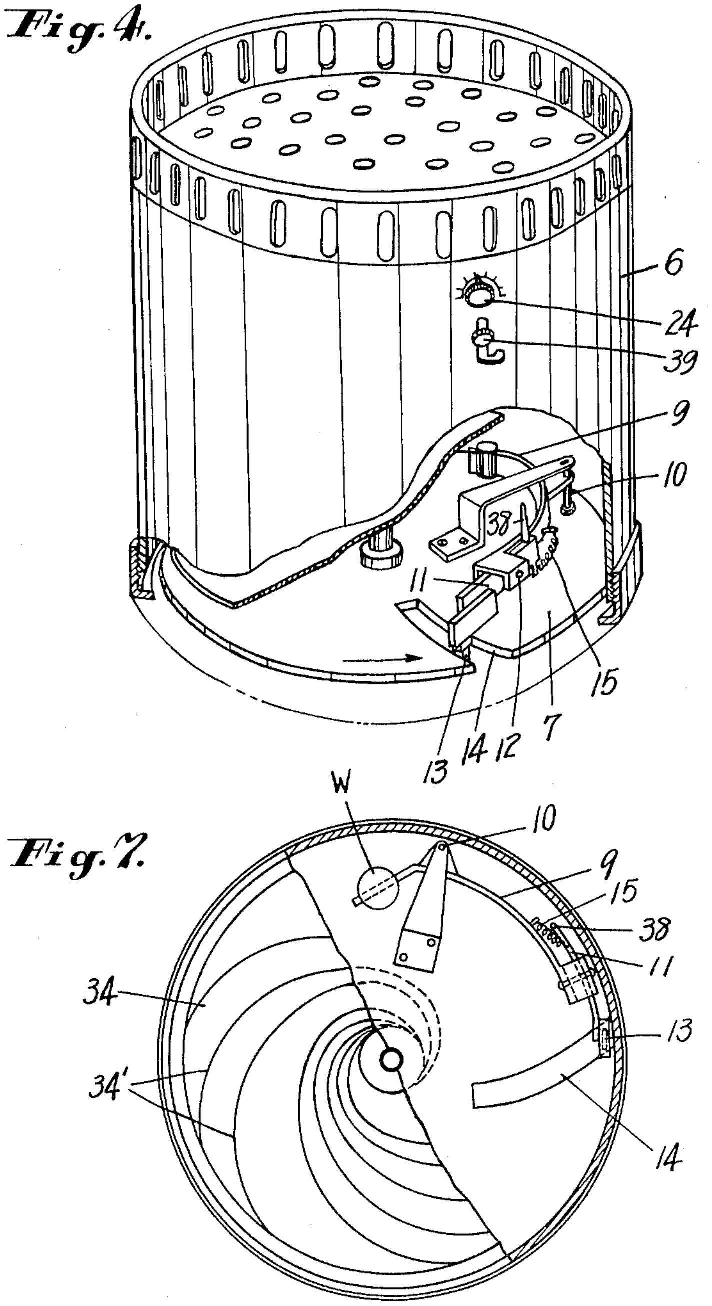
Figures 8, 9, 10:
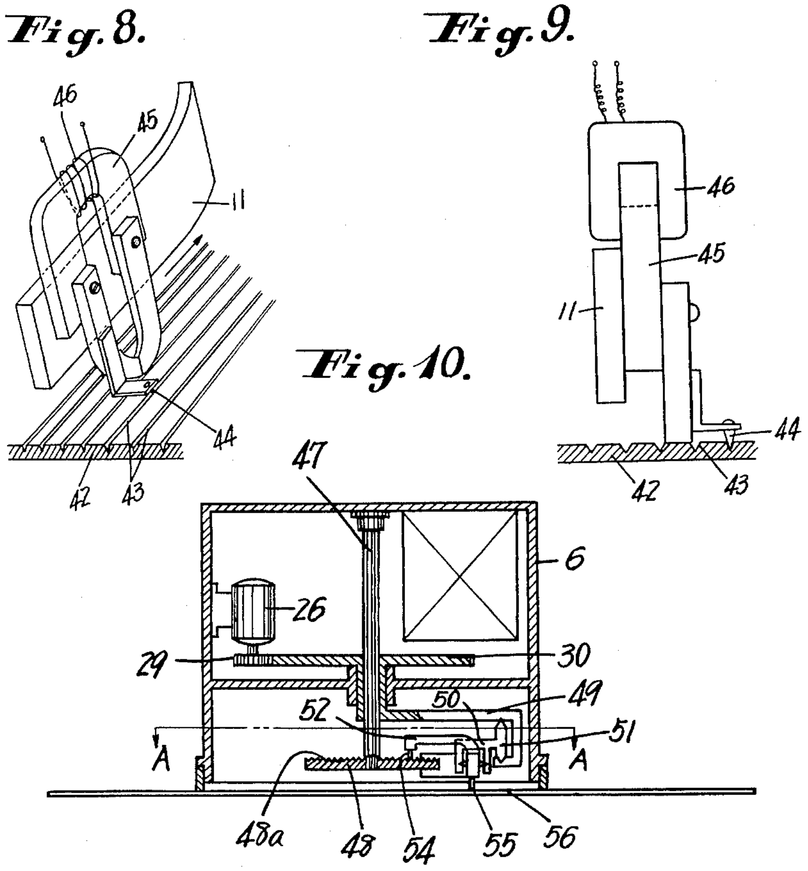
Figure 11:
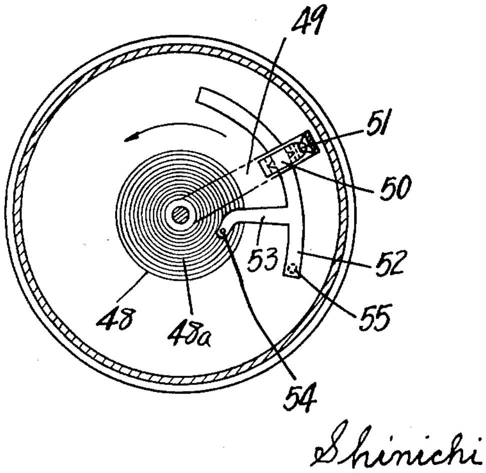
Figure 12A:
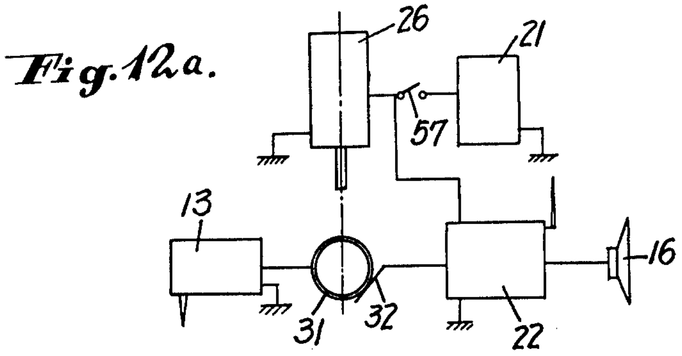
Figure 12B:
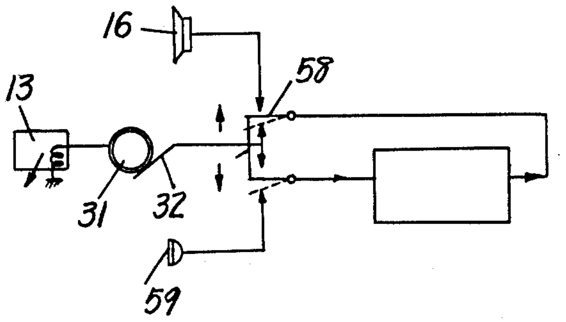
Figure 12C:
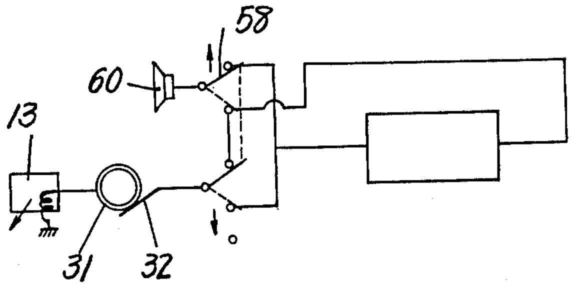

For a better understanding of this invention reference is had to the accompanying drawing, in which FIG. 1 illustrates a perspective view of a printed matter having a spiral record groove impressed thereon, FIG. 2 is a perspective view of a book on which two records are printed and illustrating a manner of application of the present system, FIG. 3 is a sectional elevation of an embodiment of the reproducing apparatus according to this invention, FIG. 4 is a perspective view of the apparatus shown in FIG. 7 partly in section, FIG. 5 is a side view of the volume controlling means, FIG. 6 is a partial sectional elevation of the lower part of the apparatus for illustrating the different rotating phase of the rotating disc and its reproducing arm shown in FIG. 3, FIG. 7 is a plan view as seen on the line A–B of FIG. 6 on the right half and an upward plan view as seen by the arrow A' with the rotating disc partly cut-off for showing the grooves of guide disc for quick return, FIG. 8 is a perspective view of a magnetic recording or reproducing head to be used when the present system is applied to a magnetic recording surface provided with guide grooves, FIG. 9 is a side view of FIG. 8, FIG. 10 is a sectional elevation of an embodiment of the present invention provided with means for guiding the recording or reproducing head to be used for a magnetic recording surface having no guide grooves, FIG. 11 is a sectional plan view of the guide means taken along the line A—A of FIG. 10, and FIGS. 12–*a*, *b* and *c* illustrate diagrammatic arrangements of electric systems for carrying out this invention.

Referring to FIGS. 1 and 2, the reference numeral 1 designates a transparent thin plate with spiral record grooves 2 printed or impressed thereon, and 3 is a printed matter or a book having the transparent record impressions 2 associated therewith. The record 2 to be used for the present system may consist of ordinary spiral sound grooves or a magnetic record having guide grooves or a plane magnetic recording surface without guide grooves. The record 2 may have a concentric circular guide groove 4 or projection, or indices 5 on the outer periphery of the record surface to facilitate bringing the lower end of the apparatus just on the center of the record. The record 2 used for the system of this invention needs no central hole which was inevitable in the former records.

In accordance with this invention the casing 6, preferably of cylindrical form, is made to fit to the marginal circular guide groove or projection 4 provided for the outer periphery of the record surface 2, or to coincide with the indices 5 with the corresponding mark on the casing and a horizontal rotating member such as disc or an arm 7 is arranged concentrically with the casing 6 at the lower part of it on a vertical shaft 8. A recording or reproducing arm 9 is pivoted on a vertical stanchion 10 secured to the disc 7 preferably at an outer position for supporting the arm 9 to swing freely thereon. To the arm 9 is hinged another arm 11 on the pivot 12 having at its free end a recording or reproducing head 13 secured thereto. For the sake of simplicity the description is made for the case of reproducing a record, but it should be noted that same may be applied to the recording, and also the rotating member is described about the rotating disc only, but it may be substituted with an arm or lever. The reproducing head 13 is moved radially about the pivotal axis 10 through a radial slot 14 provided in the disc 7. The swinging arm 9 and all attachments thereon should be made in a balanced state against the centrifugal force about the pivotal axis 10. To this end, a counter weight W may be provided for the arm 9 on its rear end to counter-balance the dead weight of the arm and its associated parts. The arm 11 is acted upon by a spring 15 to bias the head 13 always downwards to make contact with the record surface as more clearly shown in FIG. 6.

The casing 6 is provided with a loud speaker 16 secured to the lower side of the partition 17 as shown in FIG. 3. It is preferable to use a combined loud speaker and microphone for the purpose of interchanging the device from recording to reproduction. 18 represents an intermediate partition wall of the casing and 19 a lower partition and 20 an adjustable base ring screwed to the lower end of the casing 6. In the uppermost compartment of the casing, there is provided various electrical equipments such as a battery 21, an amplifier 22 for amplifying recorded and reproduced vibrations, a volume controller 23 provided with change-over switches to be operated by a handle 24 secured to the shaft 23*a*. 25 is a cam secured to the shaft 23*a* having a curved operating periphery. In the intermediate compartment there is provided motor 26 which is pivoted at 27 on a fixed arm and is biased by a spring 28 to engage the driving roller 29 on the motor shaft to cooperate with the peripheral edge of a cup shaped wheel 30, to the latter is secured a shaft 8 of the rotating disc 7. 31 represents a collector ring secured to the shaft 8, and 32 a brush cooperating with the collector ring 31, connected to the amplifier 22 through a circuit conductor 33.

Referring to FIGS. 3 and 6, a stationary disc 34 is fitted to the shaft 8 and normally biased to an upward position by means of a rod 35 rigidly secured to it and the spindle 36 connected to rod 35 and a spring 37 acting thereon. The disc 34 is provided on its lower surface with curved grooves 34′ which coperate with a pin 38 projecting from swing arm 11 when the disc 34 is pressed down by the cam 25 acting on the top of spindle 36 to make contact with the pin, thereby returning the head 13 quickly to the starting position. 39 is an operating thumb secured to the upper sleeve 40 of the spindle 36 by a lever 41, the free end 41′ of which acts on the projecting rod 26′ provided for the motor 26 when the thumb 39 is moved downwards for shifting the motor about the pivot 27 to disengage its roller 29 from the peripheral edge of the wheel 30 to stop the rotation of the disc 7. The upper end of the spindle 36 projects through the upper partition 18 just below the cam 25 to be operated thereby when the handle 24 is turned to press down the spindle 36 and the disc 34 therewith to engage its grooves 34′ the pin 38 to operate the quick return mechanism and turn the hinged arm 11 about the pivot 12 (FIG. 6) to lift up the reproducing head 13 and quickly return the needle point of the head to the starting position. After the head has been brought to the starting position, if the handle 24 is further turned the cam 25 presses down the spindle 36 further and the lever 41 therewith, then the free end 41′ of the lever 41 will act on the projection 26′ of the motor to push down one side of the motor, thereby disengaging the roller 29 from the transmission wheel 30 so that the operation of the rotary disc 7 is stopped.

FIGS. 8 and 9 illustrate another embodiment of this invention wherein the record 42 consisting of a magnetic recording surface having spiral guide grooves 43 to which a guide needle 44 secured to the tip end of the recording or reproducing arm 11 engages and is guided along the spiral grooves. 45 represents a magnet core and 46 represents a coil wound on the core 45.

The recording and reproducing apparatus according to this invention can be applied to a magnetic recording surface having no guide grooves. A construction for such embodiment is shown in FIGS. 10 and 11, wherein the same reference numerals as in FIG. 3 represent the same or similar parts. In this embodiment, a vertical shaft 47 is secured to the casing 6 to project downwardly and to its lower end is rigidly secured a stationary disc 48 which is provided with a spiral guide grove 48*a* on its upper side. A wheel 30 is rotatably fitted onto the fixed shaft 47 and arranged to be turned by a motor 26 through a friction roller 29. The wheel 30 is provided with a projecting arm or lever 49 to which is pivoted an arm 50 by means of a pivot 51. A reproducing arm 52 is pivoted on a horizontal axis provided for the arm 50. The arm 52 is provided with bifurcated arm 53, which is provided with a guide needle 54 cooperating with the spiral guide groove 48*a* of the disc 48 and the arm 52 is provided with a reproducing needle or head 55. When the motor 26 is energized to rotate the wheel 30 and the arm 49 together with it, the guide needle 54 revolves along the spiral groove 48*a* to guide the recording or reproducing head 55 spirally on a magnetic recorded and recording surface 56.

Referring to FIGS. 12–*a*, *b* and *c*, the needle of the recording or reproducing head 13 is connected to the collector ring 31 and the current is passed through brush 32 to the amplifier 22 and then to a speaker 16, the battery source 21 being connected through a switch 57 to the motor 26 and also to the amplifier 22. In FIG. 12–*b*, a change-over switch 58, is provided between the recording circuit and reproducing circuit. 59 represents a microphone for recording.

In FIG. 12–*c*, 60 represents a combined microphone and speaker and the recording circuit can be changed over to a reproducing circuit by means of a change-over switch 58 similarly to FIG. 12–*b*.

The operation of the reproducing apparatus constructed as above mentioned will be explained in the following, and the recording operation can be understood without explanation:

When the record surface 2 consists of an ordinary recorded sound grooves a needle 13 is secured to the tip end of the reproducing arm 11 as shown in FIG. 6, but when the record surface 2 consists of magnetic material provided with guide groove 43 as shown in FIGS. 8 and 9 the reproducing head provided with a guide needle 44 is secured to a tip end of the reproducing arm 11 and the reproduction of the record can be effected by means of a reproducing device as shown in FIG. 3.

The reproduction is effected by placing the apparatus on the record 2 which was recorded on the surface of a stationary article such as a printed matter, book 3 or a part of furniture and the like stationary object to coincide the center of the apparatus with the printed record. In this case the gap between the record surface 2 and the horizontally rotating disc 7 can be adjusted as desired by turning the casing 6 relatively to the screwed adjustable base ring 20. Then the handle 24 is turned, thereby turning cam 25 which was acting on the top of spindle 36 to disengage the spindle 36. In the stationary position of the apparatus, cam 25 engages the top end of spindle 36 to press down the latter against the spring 37 so that the disc 34 is pressed down to engage the pin 38 to lift up the tip of the head and the end 41′ of lever 41 acts on the projecting arm 26′ of the motor 26 to disengage its roller 29 from the cooperating wheel 30 so that all parts are in the stopped condition, but when the handle 24 is turned to bring the cam 25 to be disengaged the above mentioned condition is reversed and the volume controller and switch 23 closes the motor circuit to turn the motor 26 and the roller secured to its shaft drives the cooperating disc 30 and accordingly, the horizontal disc 7. Thus, the recording head 13 secured to the free end of the arm 11 is shifted inwardly from the starting position of the record surface 2 successively sliding on the surface an the electrical input is delivered to the slip ring 31 and then through brush 32 and circuit 33 is supplied to the amplifier 22 and the amplified output is delivered to the speaker 16 for reproducing sound or voice.

Thus, the starting operation can be controlled by the cam 25 and it enters into the full operation of the record after a definite turning angle of the cam 25 and also the volume controller 23. In this case, the arm 9 and associated parts should be well counter-balanced by the counter weight W to prevent the centrifugal force of the arm itself which causes disturbance to the reproducing head 13 and guide needle for the recording head.

When the reproducing head 13 has completed the scanning of the record surface 2 the handle 24 is turned in a reverse direction as before or further in the same direction according to the construction, the volume controller 23 is turned to lower the sound produced by the speaker gradually and at last to zero, and at the same time the spindle 36 is pressed down by the cam 25 and the sliding disc 34 is pressed down by means of connecting rod 35 to act on the pin 38, then the tip of the head 13 is disengaged from the record surface, and upon turning of the arms 9 and 11 together with disc 7 the pin 38 engages the curved groove 34' on the lower side of the disc 34 so that the arms 11 and 9 are shifted along the groove quickly to the initial starting position. At this condition, if the handle 24 is turned further a little, then the lever 41 is forced down to act on the projecting arm 26' of the motor 26 by its end 41' so that the motor 26 is tilted to disengage the roller 29 from the periphery of the wheel 30 and the operation of the rotating disc 7 is stopped. The thumb 39 fixed to the lever 41 may be used to stop the operation at once by forcing it down and it may be locked to hold the mechanism under the stationary condition by engaging the thumb to a slot provided for the purpose on the casing.

As apparent from the foregoing description, the apparatus of this invention can be very conveniently used by merely placing it on a stationary record and without turning the record which was inevitable in the heretofore usual record players.

When the record surface 2 consists of a smooth magnetic record surface without guide grooves the recording or reproducing head 55 (FIGS. 10 and 11) can be operated by the guide needle 54 engaging the spiral guide grooves 48*a* provided on the guide disc 48. All the other operations are the same as already explained.

The system of recording and reproducing according to this invention has the following advantageous effects: different from former record players, the present apparatus is made very compact enclosing all operating parts in a cylindrical casing 6 as shown in FIGS. 3 and 4 so that it can be very conveniently carried and easily operated and gives to users a safety feeling and since the casing 6 may be placed on a stationary record surface for playing as shown in FIG. 2 a very thin flexible record surface may be used for the reproduction, and the record surface can be put on any desired part of an article such as a magazine as the record does not need a central hole as in the former records and enables a user to enjoy the reading or looking and hearing at the same time with the record kept in the stationary condition.

Furthermore, the present apparatus can be used in a reversed condition for playing an ordinary record put thereon by providing a simple attachment for holding the record in a stationary condition.

What I claim is:

1. Sound reproducing and/or recording apparatus comprising a casing shaped for maintaining stationary in a predetermined position relative thereto a record surface, a rotatable member, supporting means articulated to said rotatable member for supporting a transducing head for movement to a position in which said transducing head is in a transducing relationship with said record surface, said supporting means and said rotatable member both being contained within said casing, and drive means to rotate said rotatable member, said apparatus including means to move said transducing head to a starting position comprising a pin secured to said supporting means and a horizontal disc having at least one spiral guide, said horizontal disc being movable to a position at which said pin engages said spiral guide to return said transducing head to the starting position on rotation of said rotatable member, said drive means including a motor contained within said casing, and said horizontal disc being mounted about a shaft connecting said motor to said rotatable member, said apparatus further including an operating rod connected to said horizontal disc and a spring biasing said horizontal disc away from engagement with said pin.

2. Apparatus as claimed in claim 1 including a cam engageable with said operating rod to move said horizontal disc toward said pin.

3. Apparatus as claimed in claim 2 in which said casing is a hollow cylinder having two parallel spaced circular partitions therein mounted at right angles to the axis thereof and said drive means includes an electric motor pivotally mounted between said two partitions and movable to a position at which a roller secured to the motor shaft engages the rim of a drive wheel coupled to said rotatable member, and including a loudspeaker mounted at one end of said cylinder, and an amplifier mounted in said casing.

4. Apparatus as claimed in claim 3, said apparatus further including a linkage coupling said motor to said rod so that operation of said spindle is effective to return said head to the starting position, allow said head to move into transducing relationship with a record surface held in a predetermined position relative to said casing and to disengage said roller from said drive wheel to stop rotation of said member.

5. Sound reproducing and/or recording apparatus comprising a casing shaped for maintaining stationary in a predetermined position relative thereto a record surface, a rotatable member, supporting means articulated to said rotatable member for supporting a transducing head for movement to a position in which said transducing head is in a transducing relationship with said record surface, said supporting means and said rotatable member both being contained within said casing, and drive means to rotate said rotatable member, said apparatus including means to move said transducing head to a starting position comprising a pin secured to said supporting means and a horizontal disc having at least one spiral guide, said horizontal disc being movable to a position at which said pin engages said spiral guide to return said transducing head to the starting position on rotation of said rotatable member, said supporting means comprising a first arm pivoted about an axis parallel to and spaced from the axis of rotation of said rotatable member and a second arm for supporting said transducing head pivoted to said first arm remote from the pivot point of the first arm with said rotatable member.

6. Apparatus as claimed in claim 5 in which said pin and said transducing head are respectively secured to and supported on said second arm on opposite sides of the pivot point with said first arm, the latter being balanced to counteract centrifugal force produced by rotation of said rotatable member and including a spring urging said transducing head into a transducing position.

7. Sound reproducing and/or recording apparatus comprising a casing shaped for maintaining stationary in a predetermined position relative thereto a record surface, a loudspeaker at one end of said casing, a rotatable member, supporting means articulated to said rotatable member for supporting a transducing head for movement to a position in which said transducing head is in a transducing relationship with said record surface, said supporting means and said rotatable member both being contained within said casing, and drive means to rotate said rotatable member, said apparatus including a plate having a spiral groove therein and mounted within said casing, said support means including a pin engageable with said groove to guide a head mounted on said support means in a spiral path, said casing being a hollow cylinder having a rod secured thereto coaxially therewith, said drive means including a disc freely mounted on said rod for horizontal rotation and a motor having a roller secured to its shaft engageable with the rim of said disc, and said support means including a first arm secured to said disc to be driven thereby on rotation of said motor shaft and including a magnetic recording and reproducing head pivoted to a second arm coupled to said first arm, and a threaded base ring screwed to that end of said casing remote from said loudspeaker to adjust the gap between said record surface and said horizontally rotating disc.

(Other references on following page)

References Cited by the Examiner

UNITED STATES PATENTS

| | | | |
|---|---|---|---|
| 2,535,495 | 12/1950 | James | 179—100.2 |
| 2,822,425 | 2/1958 | Hicks | 274—41.4 |
| 2,903,266 | 9/1959 | Hohnecker | 274—42 |
| 2,924,668 | 2/1960 | Hishino et al. | 274—41.4 |
| 3,000,638 | 9/1961 | Dennis | 274—41.4 |

FOREIGN PATENTS

| | | |
|---|---|---|
| 1,033,863 | 4/1953 | France. |
| 1,199,670 | 12/1959 | France. |
| 1,085,346 | 7/1960 | Germany. |
| 800,996 | 9/1958 | Great Britain. |

BERNARD KONICK, *Primary Examiner.*

NEWTON N. LOVEWELL, IRVING L. SRAGOW, *Examiners.*

R. MURRAY, J. P. SCHERLACHER, R. J. GARBACIK, *Assistant Examiners.*